United States Patent [19]
Schmidt et al.

[11] 3,987,950
[45] Oct. 26, 1976

[54] APPARATUS FOR ORIENTING AND ATTACHING FASTENERS TO AN ARTICLE

[75] Inventors: Erich A. Schmidt; Volker E. Schmidt, both of Lexington, Ky.

[73] Assignee: Textron, Inc., Providence, R.I. ; a part interest

[22] Filed: June 19, 1975

[21] Appl. No.: 588,146

[52] U.S. Cl. .............................................. 227/116
[51] Int. Cl.² .......................................... B27F 7/00
[58] Field of Search .................................... 227/116

[56] References Cited
UNITED STATES PATENTS

| | | | |
|---|---|---|---|
| 2,588,486 | 3/1952 | Clarke | 227/116 |
| 3,750,925 | 8/1973 | Schmidt et al. | 227/116 |
| 3,815,805 | 6/1974 | Beneteau | 227/116 |

*Primary Examiner*—Granville Y. Custer, Jr.

[57] ABSTRACT

A fastener element is oriented by rolling the element along a friction surface until a projection on the back of the element engages a ledge extending along the path of movement of the element such that the element then slides with a predetermined orientation. Additionally, an orienting element having a sinuous edge for orienting double pronged elements can be retracted.

8 Claims, 10 Drawing Figures

/ 1

APPARATUS FOR ORIENTING AND ATTACHING FASTENERS TO AN ARTICLE

BACKGROUND OF THE INVENTION

1. Field of the Invention

The present invention is related to apparatus for attaching two component fasteners to an article, and in particular, to a feeding and orienting arrangement in such an apparatus which assures that a projection or double prongs on the back of a round head portion of one element has a predetermined orientation when attached to the article.

2. Description of the Prior Art

The prior art, as exemplified in U.S. Pat. Nos. 1,798,970, 1,967,662, 2,878,954, 3,750,925, 3,803,698 and 3,815,805, contains a number of apparatus for attaching two component fasteners to a garment including apparatus wherein a projection or double prongs on the rear of one fastening element is utilized to orientate the one element to a predetermined orientation prior to attaching to an article. In particular the above U.S. Pat. No. 3,815,805 discloses an apparatus wherein a head element is rotated by engagement along a frictional surface until a projection on the reverse of the element engages the side of a profiled end of a pusher arm extending partially over the reverse of the element to bring the element into proper registration; and the above U.S. Pat. No. 3,750,925 discloses an apparatus with spring biased elements with inner surfaces which have a non-linear tapering profile forming a labyrinth passage for engaging and orienting the prongs of head elements.

SUMMARY OF THE INVENTION

The invention is summarized in that there is provided a ledge extending along one side of a slide path and partially over the back of an element moving down the slide path to engage an orienting projection on the back of the element. The element is rotated by being pushed between high and low friction means engaging the opposite sides of the element along the slide path; the rotation being stopped by the engagement of the ledge with the orienting projection to produce a desired orientation of the element. The orienting and feeding arrangement for the element is included in an apparatus for attaching the element with a mating element to an article; one of the elements having a deformable prong for securing the one element through the article to the other element.

An object of the invention is to construct a feeding and orienting arrangement for fastener element attaching apparatus and which can be readily adapted to apparatus not requiring orientation of the fastener elements.

Another object of the invention is to eliminate the necessity of a contoured end on a pusher for engaging the projection on a rolling fastener element.

It is also an object of the invention to provide ledge means extending along the path of rotative movement of the fastener element to engage a projection on the fastener element to stop rotative movement and allow sliding movement of the fastener element with a predetermined orientation.

A further object of the invention is to construct a fastener element attaching apparatus having alternate facilities or changeable facilities for orienting two pronged fasteners elements and for orienting fasteners elements with orienting projections.

Other objects, advantages and features of the invention will become apparent from the following description of the preferred embodiment when taken in conjunction with the accompanying drawings.

DESCRIPTION OF THE PREFERRED EMBODIMENTS

Figure 1:
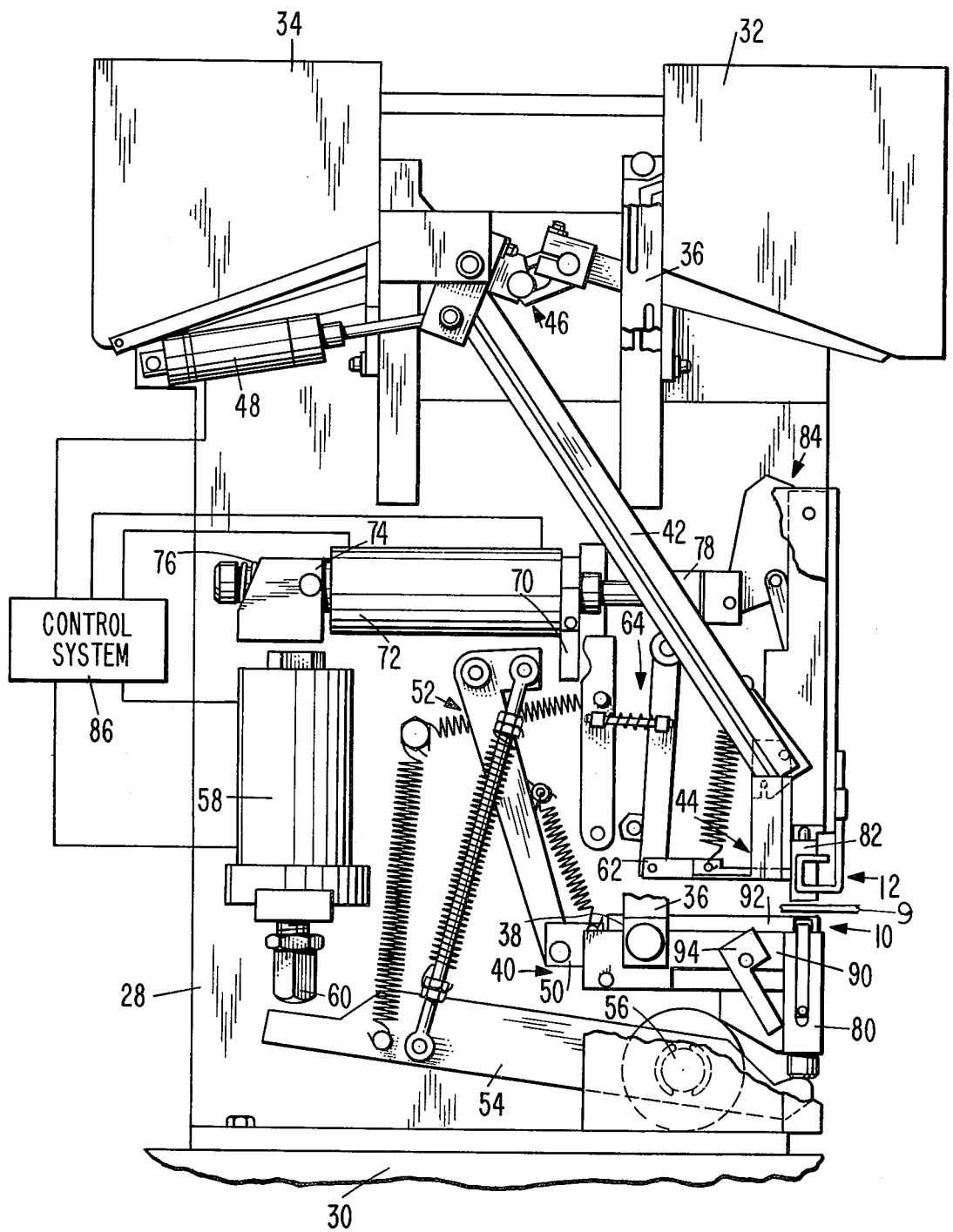
FIG. 1 is an elevation view of an apparatus for attaching elements to an article in accordance with the invention.
Figure 2:
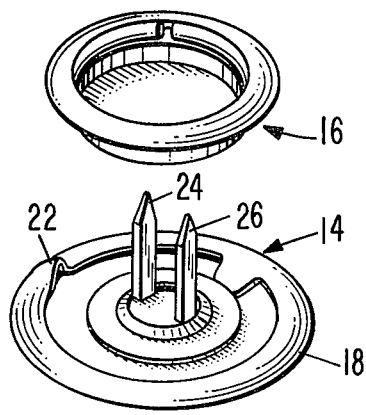
FIG. 2 is perspective view of one type of paired elements suitable for attaching to an article by the apparatus of FIG. 1.
Figure 3:
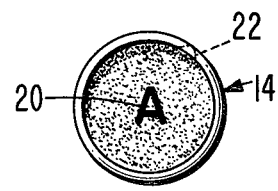
FIG. 3 is a view of a face of one of the elements of FIG. 2.

As illustrated in FIG. 1, the invention is embodied in an apparatus for attaching mating elements to an article 9 positioned between a lower station indicated generally at 10 and an upper station indicated generally at 12. The mating elements may be decorative or fastening elements, such as the elements indicated generally at 14 and 16 in FIG. 2 forming a snap fastener device when attached to an article. The element 14 has a round head portion 18 which has a front or obverse, shown in FIG. 3, with indicia or markings 20 which have a predetermined orientation with respect to a projection 22 formed on the back or reverse of the head portion 18 adjacent the periphery of the head portion 18. The particular type of fastener illustrated in FIG. 2 has a pair of prongs 24 and 26 extending from the rear of the head portion 18 for insertion through the article and into the element 16 where the prongs 24 and 26 are to be deformed to secure the elements 14 and 16 together. Other suitable types of elements with markings 20 and projections 22 may include single prongs or tubular prongs for being deformed to secure the mating elements together.

The apparatus shown in FIG. 1 has a plate-like support 28 vertically mounted upon a table top 30. Hoppers 32 and 34 are mounted on the upper end of the support 28 for containing respective pluralities of the elements 14 and 16. A chute 36, only partially shown, extends downward from an outlet of the hopper 32 to an entrance 38 of a slide path in a feeding and orienting arrangement, indicated generally at 40, mounted on the support 28 and extending to the lower station 10. A chute 42 extends downward from an outlet of the hopper 34 to a slide path formed in an upper feed assembly indicated generally at 44 mounted on the support 28. Suitable discharge means, indicated generally at 46, operated by an air cylinder 48 are mounted on the support 28 for discharging the elements 14 and 16 from the respective hoppers 32 and 34 into the chutes 36 and 42 for being fed by gravity to the feeding and orienting arrangement 40 and feeding assembly 44, respectively.

A pusher slide bar 50 is slideable mounted within the feeding and orienting arrangement 40 and is connected by a lever mechanism indicated generally at 52 to a lever 54 pivoted at 56 for reciprocating the pusher 50 when the lever 54 is pivoted. An air cylinder 58 is mounted on the support 28 and has piston rod means 60 for engaging the lever 54 to pivot the lever 54. A pusher or slide bar 62 is slidable mounted within the feeding assembly 44 and is connected to a spring biased lever mechanism indicated generally at 64 which is adapted for being engaged and moved by a member 70 mounted on an air cylinder 72 which is slidably supported on a block 74 pivotally secured to the support 28. A spring 76 biases the cylinder 72 against the block 74 such that during a portion of the movement of the piston rod 78 and the air cylinder 72 adjacent the fully retracted position of the piston rod 78, the air cylinder 72 moves to engage the member 70 with the lever mechanism 64 to advance or retract the pusher 62.

A lower ram assembly 80 operated by the lever 54 is positioned at the station 10 for vertically lifting an article 14 from the station 10. An upper ram assembly 82 is attached to a lever mechanism indicated generally at 84 which is pivotally attached to the piston rod 78 for raising and lowering the ram assembly 82 during the motion of the piston rod 78 adjacent the most advanced position of the piston rod 78. The air cylinders 48, 58, and 72 are operated by a control system 86.

Inasmuch as the hoppers 32 and 34, the chutes 36 and 42, the feed means 44, the discharge means 46, the lever mechanisms 52, 64, and 84, the pushers 50 and 62, the ram assemblies 80 and 82 and the control system 86 are substantially similar to that well known in the art by being described in the prior art and/or having been utilized on commercially available fastener attaching machines, they are not described in further detail herein. Additionally our U.S. Pat. Nos. 3,750,925 and 3,803,698 are hereby incorporated herein by reference.

Figure 4:
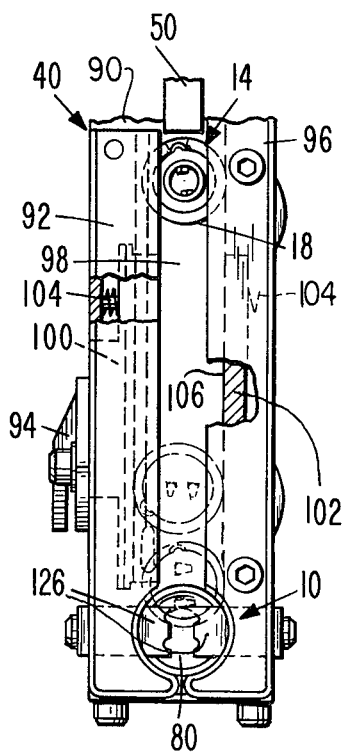
FIG. 4 is a plan view of a feeding and orienting arrangement in the apparatus of FIG. 1.

The feeding and orienting assembly 40 has a block 90 mounted on the support 28 and has a member 92 pivotally mounted on the top of the block 90. The member 92 is adapted to be secured in a closed position by a suitable securing device 94. As shown in FIG. 4, the member 92 is mounted along one edge of the top of the block 90 while a fixed member 96 is mounted on the opposite edge of the top of the block 90 to define a portion of slide path 98 extending from the entrance of the feeding and orienting assembly 40 to the lower station 10. The members 92 and 96 have respective elongated friction bars 100 and 102, FIGS. 4 and 5, slidingly mounted therein and extending along opposite sides of the slide path 98 for sliding movement perpendicular to the slide path 98. Suitable biasing means such as springs 104 bias the bars 100 and 102 toward the edges of the slide path 98 such as to engage the bars 100 and 102 against the opposite sides of the periphery of the head portion 18 of the fastening element 14 as it is pushed down the path 98.

The bar 102 has a substantially flat vertical wall 106 for engaging the periphery of the head portion 18 while the bar 100 engages the periphery of the head portion 18 within a groove 108 formed therein. The groove 108 has an upper surface 110 and a lower surface 112 which are inclined at an angle with respect to each other such as to wedgingly engage the periphery of the head portion 18 with substantially greater force than the engagement of the wall 106 with the head portion 18 such that the head portion 18 rolls along the member 100. The members 100 and 102 have a length along the slide path 98 designed to produce substantially a complete revolution of the head element 18 if necessary.

Figure 5:
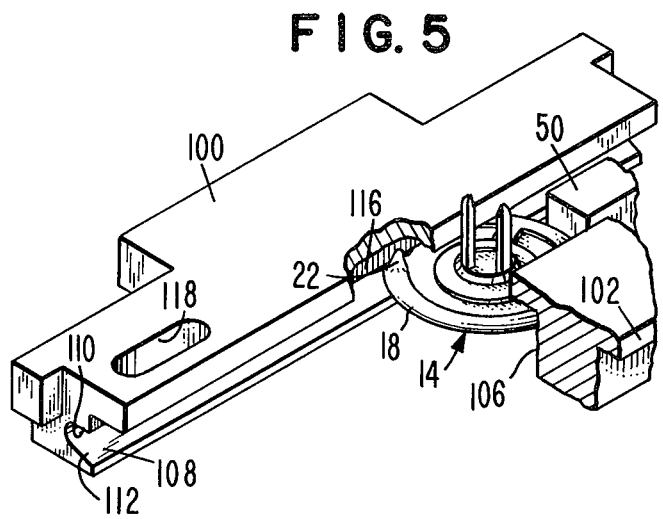
FIG. 5 is a perspective view of a broken away portion of the arrangement of FIG. 4.
Figure 6:
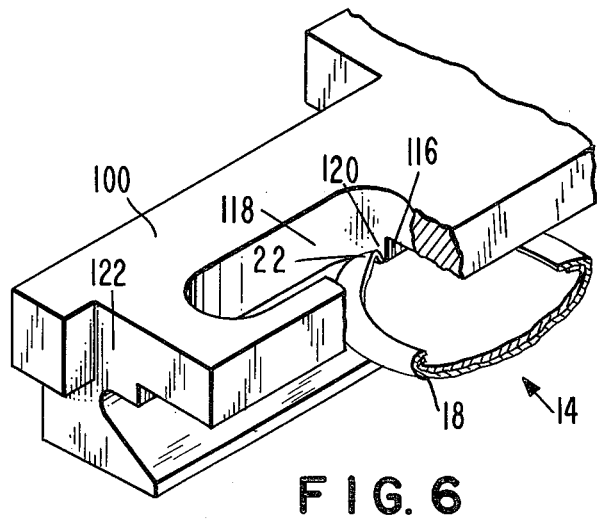
FIG. 6 is an enlarged perspective view of a portion of one member of the arrangement shown in FIGS. 5 and 6.

The bar 100 has formed thereon a ledge 116 which extends partially over the back surface of the head portion 18 sufficient to engage the projection 22 as the element 14 rolls along the bar 100. The ledge 116 is designed to stop further rolling of the head portion 18 upon engagement with the projection 22 to thus bring about a predetermined orientation of the element 14. A cutout 118, FIGS. 5 and 6, is formed toward the exit end 122 of the bar 100 such as to remove a portion of the ledge 116 and thus form a terminal point 120 to the ledge 116. The cutout 118 formed in the ledge 116 has a depth and length along the longitudinal dimension of the bar 100 such as to allow further rotation of the head portion 18. The terminal point 120 is formed a predetermined distance from the exit end 122 of the bar 100 to produce a predetermined degree of the further rotation of the head portion 18 to bring about proper orientation of the markings 20, FIG. 3, on the element 14 in the station 10.

Additionally, when the apparatus is used to attach two pronged elements, the station 10 may be provided with conventional movable jaw means 126 for further adjusting the orientation of the element 14.

In operation of the fastener element attaching apparatus of FIG. 1, the control system 86 operate the air cylinder 48 to suitably discharge the respective elements 44 and 16 from the respective hoppers 32 and 34 into the chutes 36 and 42. The control system operates the air cylinders 58 and 72 to retract the piston rods 60 and 78 and to operate the lever mechanisms 52 and 64 to advance the pushers 50 and 62 sliding the elements 14 and 16 in the feeding and orienting mechanism 40 and the feeding mechanism 44 to the respective stations 10 and 12. Upon subsequent advancement of the piston rods 60 and 78 by the control system 86, the pushers 50 and 62 are retracted and the lever 54 operates the ram assembly 80 simultaneously with the lever mechanism 84 operating the ram assembly 82 to secure the elements 14 and 16 together on an article 9 which is positioned between the stations 10 and 12.

Referring to FIGS. 4, 5 and 6, the element 14 being advanced down slide path 98 is pushed between the friction bars 100 and 102 which under the force of springs 104 engage the periphery of the head portion 18 on opposite sides thereof. Since the bar 100 engages the periphery of the head portion 18 at surfaces 110 and 112 in the groove 108 at an incline to the force from the springs 104, the resultant forces normal to the surfaces 110 and 112 on the head portion 18 are substantially greater than the force from the vertical wall 106 on the head portion 18; thus the friction against sliding movement is substantially greater on the bar 100 than on the bar 102 tending to roll the head portion 18 along the bar 100. The head portion 18 rolls along the bar 100 until the projection 22 engages the ledge 116. Since the ledge 116 has a vertical wall which is engaged by the projection 22, a substantial portion of the force from springs 104 is now applied between the ledge 116 and projection 22 substantially reducing the forces normal to surfaces 110 and 112 to reduce the frictional engagement with bar 100 to allow the element 14 to slide along bar 100 upon further advancement; thus the element 14 is oriented to a predetermined orientation. The reduction in frictional forces between surfaces 110 and 112 and the periphery of the head portion 18 reduces any tendency to mar the element 14.

At the terminal point 120 the engagement of the projection 22 with the ledge 116 ends and the engagement forces of the surfaces 110 and 112 with the peripheral portion of the head increase thus again producing rotation of the head portion of the element 14. Since the terminal point 120 of the ledge 116 is located a predetermined distance from the end 122 of the friction bar the element 14 rotates through a further predetermined angle which is selected to bring about proper registration of the element 14 in the station 10. Minor adjustment of the orientation of the element 14 may be accomplished by the jaws 126.

The friction bars 100 and 102 on the members 92 and 96 can be quickly changed with corresponding elements on members guiding fastening elements which do not require a predetermined orientation in prior art apparatus, such as described in our prior U.S. Pat. No. 3,750,925.

Figure 7:
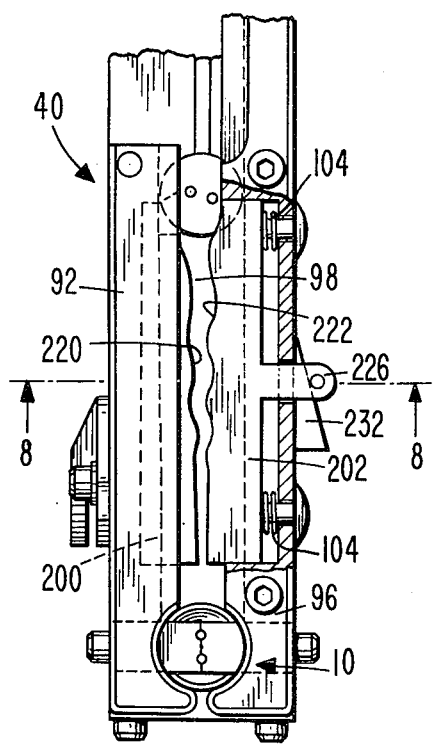
FIG. 7 is a top view of a modification to the apparatus for attaching elements to a article in accordance with the invention.
Figure 8:
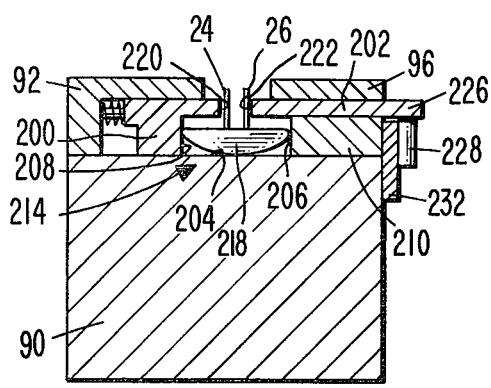
FIG. 8 is cross section view taken along line 8—8 of FIG. 7.
Figure 9:
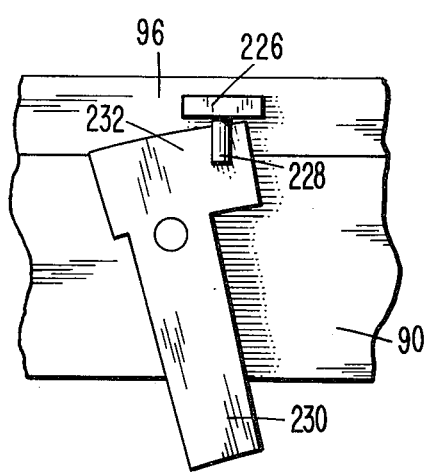
FIG. 9 is a side elevation view of a portion of the modification of FIG. 7.
Figure 10:
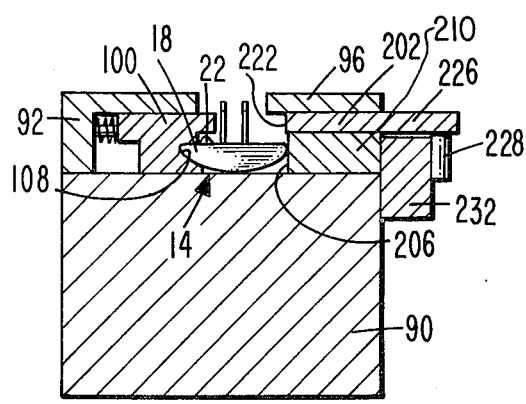
FIG. 10 is a cross section view similar to FIG. 8 but showing an alternate arrangement of the modification.

In a modification illustrated in FIGS. 7, 8, 9, and 10, various parts are identified by the same numerals used to identify part in FIGS. 1–6 indicating that such commonly identified parts are substantially similar in structure and/or for function. In FIGS. 7 and 8 the friction bar 100 is replaced by an element 200, while in FIG. 10 the friction bar 100 is shown reinserted into the member 92. The member 96 is modified to receive an element 202 mounted in the member 96 for sliding movement transverse to the slide path 98. The modification in FIGS. 7, 8, and 9 is adapted to orient the prongs 24 and 26 of fastener elements such as indicated generally at 214, which have head portion 218 without any orienting projection or markings with a single orientation; and the modification in FIG. 10 is adapted to orient the fastener element 18.

The elements 200 and 202 are biased toward each other on opposite sides of the slide path 98 by the spring means 104. The slide path between the elements 200 and 202 has a bottom 204 and two vertical side walls 206 and 208; the wall 206 is formed by an edge of a bar 210 fixed relative to block 90, and the wall 208 is formed by an inner edge of the lower portion of element 200. As shown in FIGS. 7 and 8 the inner edge 222 of the element 202 and the inner edge 220 of an upper flange portion of the element 200 extend inward over the path of movement of the head portion 218. The inner edges 220 and 222 are non-linear or sinuous with undulations decreasing in magnitude in the direction of feed for the fastening elements 214 and form a sinuous channel which decreases in width along the path of movement of the prongs 24 and 26 of the fastening elements 214.

The element 202 has a horizontal extension 226 extending through a suitable opening in the outward side of the member 96. A vertical pin 228 extends downward from the extension 226. A lever 230 pivotally mounted on the block 90 has a camming portion 232 for selectively engaging the inside of the pin 228 to move the element 202 against the force of the springs 104 and hold the element 202 with the edge 222 retracted from the path of movement of the prongs 24 and 26 as shown in FIG. 10.

In the modification of FIGS. 7–10 the fastener attaching apparatus can be adapted to orient either two prong fastening elements 214 without orienting projections or to orient fastening elements 14 having orienting projections 22. When the lever 230 is positioned so that the camming surface 232 allows the element 202 to move from its retracted position and when the element 200 is inserted in the member 92, the prongs 24 and 26 of fastening elements 218 being pushed down the path 98 are engaged by the sinuous edges 220 and 222 to orient the prongs 24 and 26 in a single plane parallel to the path of movement as described in U.S. Pat. No. 3,750,925. When the friction bar 100 is inserted in the member 92 and the lever 230 is pivoted to engage the camming portion 232 with the pin 228 to retract the element 202, the head portion 18 is rotated by the difference in frictional forces from the engaging walls 206 and the groove 108 in the friction bar 100 to orient the fastener element 14 in the same manner as previously described.

Since many variations, modifications and changes in detail may be made to the presently described embodiment it is intended that all matter in the foregoing description and shown in the accompanying drawings be interpreted as illustrative and not in a limiting sense.

What is claimed is:

1. In an apparatus for attaching first and second mating elements to articles wherein one of the first and second elements has a deformable prong extending therefrom for securing the one element through the article to the other of the first and second elements, the first element having a round head portion with a design to be oriented on the front of the head portion and an orienting projection on the back of the head portion adjacent the periphery of the head portion; an improved arrangement for feeding and orienting the first element comprising
   means forming a slide path for the first element,
   a pusher for engaging and pushing the first element along the slide path,
   a pair of members disposed on opposite sides of the slide path,
   a first member of said pair of members having high friction means and the second member of said pair of members having low friction means, said high and low friction means extending along respective opposite sides of the slide path,
   means biasing at least one of the high and low friction means to engage the head portion on opposite sides of its periphery between the high and low friction means such as to rotate the first element as the first element is pushed down the slide path, and
   ledge means extending along one side of the slide path and partially over the back of the first element while moving down the slide path to engage the orienting projection and prevent further rotation of the first element such as to orient the first element to a predetermined orientation.

2. An invention as claimed in claim 1 wherein said ledge means has a terminal point a predetermined distance from the exit end of said friction means of the first and second members such as to produce a predetermined degree of rotation of the first element from the predetermined orientation.

3. An invention as claimed in claim 1 wherein the one friction means includes a friction bar extending along the side of the slide path, and the ledge means includes a ledge on the friction bar extending partially over the back of the first element.

4. An apparatus for attaching first and second mating elements to articles wherein one of the first and second elements has a deformable prong extending therefrom for securing the one element through the article to the other of the first and second elements, the first element having a round head portion with a design to be oriented on the front of the head portion and having an orienting projection on the back of the head portion adjacent the periphery of the head portion, said apparatus comprising a lower station means adapted for supporting the first element, an upper station means vertically aligned with the lower station means and spaced above the lower station means, said upper station means adapted for supporting the second element, ram means for forcing the first and second elements at the lower and upper station means toward each other, means forming a slide path extending horizontally to the lower station means, a first hopper-and-feeding means for containing and feeding the first element from a plurality to a point in the slide path spaced from the lower station means, a second hopper-and-feeding means for containing and feeding the second element from a plurality to the upper station means, a pusher mounted for sliding movement in the slide path, means for operating the ram means and the pusher to assemble the first and second elements on an article between the lower and upper stations and to advance the pusher after operation of the ram means to push the first element down the slide path to the lower station, a pair of friction bars disposed on opposite sides of the slide path, means biasing the pair of friction bars into engagement with the periphery of the head portion of the first element along a portion of the slide path, a first of said pair of friction bars having a groove with opposite inclined surfaces for engaging the first element and the second of said pair of friction bars having a vertical wall for engaging the first element such as to rotate the first element as the first element is pushed along the slide path, said first and second friction bars having a length along the slide path sufficient to produce substantially a complete rotation of the first element, one of said pair of friction bars having a ledge for extending partially over the back of the first element to engage the orienting projection and prevent further rotation of the first element such as to orient the first element to a predetermined orientation.

5. An apparatus as claimed in claim 4 wherein the one friction bar is the first friction bar, and said ledge has a terminal point a predetermined distance from the exit end of the first and second friction bars such as to produce a predetermined degree of rotation of the first element from the predetermined orientation.

6. In an apparatus adaptable for attaching any of a variety of different fastening elements including a first fastening element to an article wherein the first fastening element has a pair of prongs which are to be aligned in a single plane, an improved arrangement for feeding and orienting the variety of fastening elements comprising means forming a slide path for the variety of fastening elements along the plane;

means for pushing the variety of fastening elements along the slide path;

said means forming a slide path including a bottom and side walls for the slide path;

an orienting element having a sinuous edge inclined toward the center of the slide path in the direction of movement along the slide path; and means for selectively positioning the orienting element in a first position to engage the sinuous edge with the prongs of the first fastening element in the slide path to orient the prongs of the first element and in a second position wherein the orienting element is retracted to prevent engagement with other fastening elements; said means for selectively positioning the orienting element including means biasing the orienting element toward the center of the slide path, and cam means for selectively retracting the orienting element against the biasing means.

7. An invention as defined in claim 6 wherein the means for selectively positioning the orienting element includes an extension extending horizontally from the orienting element, a pin mounted vertically on the extension, and a pivotal lever, said cam means formed on one end of the pivotal lever for engaging the pin to retract the orienting element.

8. An apparatus for attaching first and second mating fastening elements to articles wherein the first element has a round head portion and is selected from the group including a double pronged fastening element and an oriented design fastening element with an orienting projection on the back of the head portion adjacent the periphery of the head portion, said apparatus comprising a lower station means adapted for supporting the first fastening element, an upper station means vertically aligned with the lower station means and spaced above the lower station means, said upper station means adapted for supporting the second fastening element, ram means for forcing the first and second fastening elements at the lower and upper station means toward each other, means forming a slide path extending horizontally to the lower station means, a first hopper-and-feeding means for containing and feeding the first fastening element from a plurality of first fastening elements to a point in the slide path spaced from the lower station means, a second hopper-and-feeding means for containing and feeding the second fastening element from a plurality of the second fastening elements to the upper station means, a pusher mounted for sliding movement in the slide path, means for operating the ram means and the pusher to assemble first and second fastening elements on an article between the lower and upper stations and to advance the pusher after operation of the ram means to push a first fastening element down the slide path to the lower station, a friction bar having a groove with opposite inclined surfaces for engaging the periphery of the head portion of the oriented design element and having a ledge for extending partially over the back of the oriented design element to engage the orienting projection, a first orienting element having an upper flange with an inner sinuous edge for extending over the head portion to engage the prongs of the double pronged element, a first member on one side of the slide path for alternately receiving and slidably supporting the friction bar and the first orienting element along a first side of the slide path, means for biasing the friction bar or the first orienting element toward the center of the slide path, a second bar having a wall extending along the other side of the slide path for engaging the periphery of the head portion opposite to the friction bar, a second orienting element having an inner sinuous edge for extending over the head portion to engage the prongs of the double pronged element, a second member mounted on the other side of the slide path slidably supporting the second orienting element for movement transverse to the slide path, and means for selectively positioning the second orienting element in a first position to engage the sinuous edge of the second orienting element with the prongs of the double pronged element and in a second position wherein the second orienting element is retracted to prevent engagement with other fastening elements.

* * * * *